(12) United States Patent
Littlepage et al.

(10) Patent No.: US 10,211,969 B1
(45) Date of Patent: Feb. 19, 2019

(54) SECURE SYSTEM FOR THE SYNCHRONIZED COLLECTION AND DISTRIBUTION OF TRANSACTIONAL MESSAGES AMONG UNTRUSTED GEOGRAPHICALLY DISTRIBUTED USERS

(71) Applicants: Kelly Littlepage, New York, NY (US); Stephen Johnson, Brooklyn, NY (US)

(72) Inventors: Kelly Littlepage, New York, NY (US); Stephen Johnson, Brooklyn, NY (US)

(*) Notice: Subject to any disclaimer, the term of this patent is extended or adjusted under 35 U.S.C. 154(b) by 42 days.

(21) Appl. No.: 15/216,685

(22) Filed: Jul. 21, 2016

Related U.S. Application Data

(60) Provisional application No. 62/195,185, filed on Jul. 21, 2015.

(51) Int. Cl.
*H04L 7/00* (2006.01)
*H04L 12/26* (2006.01)
*H04L 12/801* (2013.01)

(52) U.S. Cl.
CPC .......... *H04L 7/0054* (2013.01); *H04L 43/106* (2013.01); *H04L 47/12* (2013.01)

(58) Field of Classification Search
None
See application file for complete search history.

(56) References Cited

U.S. PATENT DOCUMENTS

| | | | |
|---|---|---|---|
| 6,647,430 B1 * | 11/2003 | Minyard | H04L 12/4637 370/397 |
| 2002/0174055 A1 * | 11/2002 | Dick | G06Q 40/04 705/37 |
| 2005/0044351 A1 * | 2/2005 | Harvey | H04L 9/3247 713/153 |
| 2005/0097026 A1 * | 5/2005 | Morano | G06Q 40/04 705/37 |

* cited by examiner

*Primary Examiner* — Brian S Roberts (57) ABSTRACT

A method and arrangement for the coordinated, distributed, and linearly ordered collection and publication of event streams (i.e. time series data) includes features that harden it against internal errors, network partitions, data loss/corruption, and adversaries who wish to tamper with or interrupt its operation. Two modes of operation are described, one in which events are processed in aggregate (batching), and another in which updates occur continuously across the system.

11 Claims, 6 Drawing Sheets

SECURE SYSTEM FOR THE SYNCHRONIZED COLLECTION AND DISTRIBUTION OF TRANSACTIONAL MESSAGES AMONG UNTRUSTED GEOGRAPHICALLY DISTRIBUTED USERS

CROSS REFERENCE TO RELATED APPLICATION(S)

This application claims the benefit of Provisional Application 62/195,185, filed on 21 Jul. 2015 and entitled A SYSTEM FOR THE SYNCHRONIZED COLLECTION AND DISTRIBUTION OF DATA. The contents of that prior application are hereby incorporated by reference in their entirety.

BACKGROUND

Coordinating the collection and distribution of events (data, computational state, messages, etc.) is a problem fundamental to topics in computer science ranging from resource load balancing to database design. In the theory of distributed systems, properties known as linearizability, serializability, and strict serializability are used to characterize the systems and describe how events (operations) within the systems are ordered and made visible.

An operation is said to be linearizable if a component external to the system observes the operation as instantaneous and occurring at a specific moment in wall-time (as opposed to logical time, which pertains to the ordering of events internal to the system and not what a literal clock reads). Serializability and strict serializability concern the visibility and isolation of one or more such operations. A system is said to be serializable if it guarantees that there exists some total ordering on a set of transactions (a transaction being an all-or-nothing sequence of operations). Strictly serializable systems are both linearizable and serializable. Ensuring these properties in a distributed system comes at the cost of latency (and as a corollary, reduced throughput) as neither linearizability nor serializability is possible without coordination.

The invention described henceforth concerns a specific class of systems in which transactions are restricted to single read/write operations. Linearizability is a special case of strict serializability in such cases. The proposed system addresses a use case in which events (messages, datapoints, packets, etc) arrive at a plurality of ingress nodes, with each arrival constituting a single write. The phrase probabilistically linearizable refers to the situation in which a system is linearizable with some probability p (where p is assumed to be large), and a violation of the total-ordering (wall-time) constraint occurs with probability 1-p. There are two situations of interest, one in which the system can definitively assign a total ordering for some set of events, and another in which ambiguity exists. In the case of the latter, probabilities with confidence intervals can be assigned to potential event orderings, independent of the arrival process.

Significant performance gains are possible for applications that can tolerate probabilistic linearizability. Using timestamps as a means of ordering writes allows components of a distributed system to operate independently. This greatly reduces latency and increases parallelism at the cost of strict linearizability. Wall-time is an abstract notion dependent on both the clock used to tell time and the ability of the underlying system to timestamp an event deterministically. As ideal clocks cannot exist, no two components of a distributed system will ever have identical notions of wall-time. The extent to which events appear out-of-order to an omnipotent observer after being ordered by wall-time depends on the accuracy, precision, resolution, and synchronization of clocks used in the system.

Accurately timestamping events presents many challenges. Hardware clocks on typical desktops and servers are low resolution, and software introduces additional jitter and inaccuracy. Furthermore, high-precision synchronization between clocks (also known as time transfer) is highly technical and requires specialized hardware. Doing so securely presents even greater challenges. Methods relying on GNSS (global navigation satellite systems, e.g. GPS) are subject to spoofing and denial of service. Protocols such as NTP (network time protocol) cannot achieve sub-millisecond accuracy over longer network hops, and high precision protocols such as IEEE 1588 PTP can only be used over short network segments within a data center.

Additional technical background may be found in the appended listing of patents and technical publications, which are hereby incorporated by reference in their entirety.

OVERVIEW OF THE DISCLOSED INVENTION

The following disclosure concerns methods, hardware and algorithms for the secure, high-performance replication and ordering of messages and state across a distributed system, and for the secure, reliable, distributed, and ordered propagation of messages and events across a network of computers. In particular, the disclosed methods for the streaming use case improve on the accuracy, performance, security, and capability of globally distributed systems such as Google's Spanner while the disclosed batching mechanism offers a new and novel approach to scaling cycle-based systems.

This disclosure also addresses the separate but related problem of constructing a probabilistically linearizable system in which the amount of time needed to guarantee global consistency is bounded and minimized. In particular, certain disclosed embodiments implement novel methodology for synchronizing time in a fashion that's robust against both failure and tampering, as well as a method for timestamping messages that arrive in more than one piece (packet/data frame), along with a means of providing resilience against transmission loss without the need for explicit ACK/NAK messages (which necessitate a network round trip and additional latency).

Aspects of the disclosed system design enable exceptionally high volume and low latency message processing (where a message is taken to mean any sort of packet, data frame, or event originated by a human or computer), along with proof of a message's providence and creation time. The disclosed system has the benefit of offering a security model in which timestamping functionality can be collocated with an untrusted third party's infrastructure for low latency timestamping. This allows the third party to demonstrate that a message was created within a specific window of time with much lower latency and higher accuracy than would be possible otherwise. Using the techniques disclosed, messages can be processed in a streaming fashion, or as a batch.

Also disclosed is a practical application of the above mentioned functionality to order matching in a financial exchange in a manner that encourages decentralized entry of legitimate buy and sell orders by eliminating any incentives for latency based on physical proximity to the exchange.

BRIEF DESCRIPTION OF THE DRAWINGS

For a more complete understanding of the invention, reference is made to the following description and accompanying drawings, in which.

DETAILED DESCRIPTION OF EXEMPLARY EMBODIMENT(S)

Figure 1:
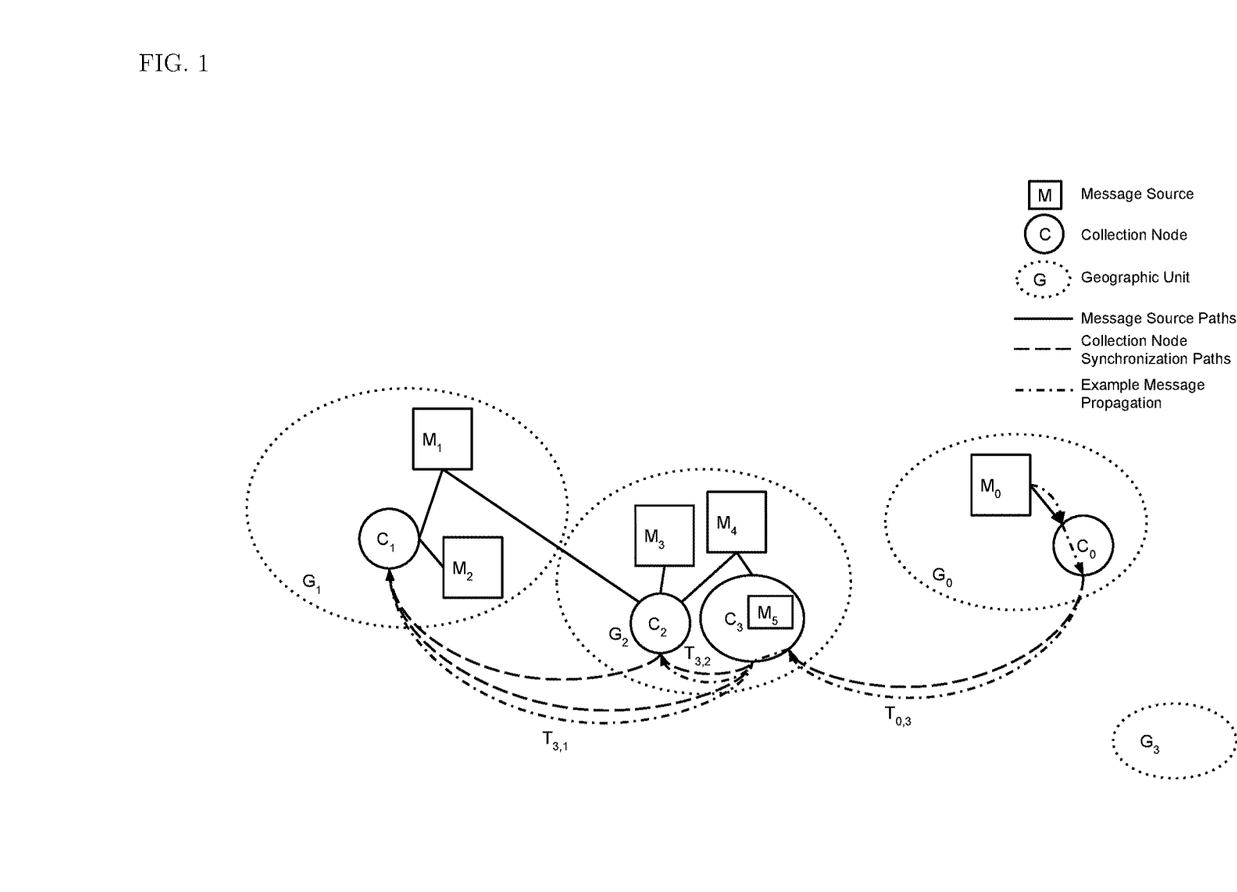
FIG. 1 is a depiction of the message and event network.

FIG. 1 depicts an example arrangement of message sources [$M_i$], collection nodes [$C_i$], geographic units [$G_i$], and communication links represented by connecting lines. This arrangement intends to demonstrate message propagation throughout geographically distributed collection sites.

One or more message sources may send messages to one or more collection nodes located in the same site (e.g. [$M_5$] to [$C_3$]), the same geography (e.g. [$M_1$] to [$C_1$]), or a different geography (e.g. [$M_1$] to [$C_2$]). Geographies are assumed to be different physical locations separated by significant distance or other communication factors sufficient to introduce transmission challenges such as link reliability, latency, jitter, and data corruption. Collection nodes may maintain communication links (e.g. [$C_0$]→[$C_3$]) for propagation of messages received from message sources. These links are represented in the drawing as dashed connecting lines.

An important aspect of this disclosure is fast global replication and propagation of messages, state, and/or events. Connecting lines with alternating dashes and dots depict an example message propagation from a source [$M_0$] to a single collection node [$C_0$], then to all other collection nodes. In this sequence, a message originates from [$M_0$] and is transmitted to collection node [$C_0$]. Collection node [$C_0$] forwards the message to [$C_3$] via transmission path [$T_{0,3}$]. Collection node [$C_3$] then forwards the message to [$C_2$] and [$C_1$] via transmission paths [$T_{3,2}$] and [$T_{3,1}$] respectively.

Generally, messages originating from different sources will propagate along different paths such that the highest end-to-end route latency is minimized. The manner of this propagation including routing and encoding is described further in FIG. 2, FIG. 3, and in the detailed description of the invention.

Figure 2:
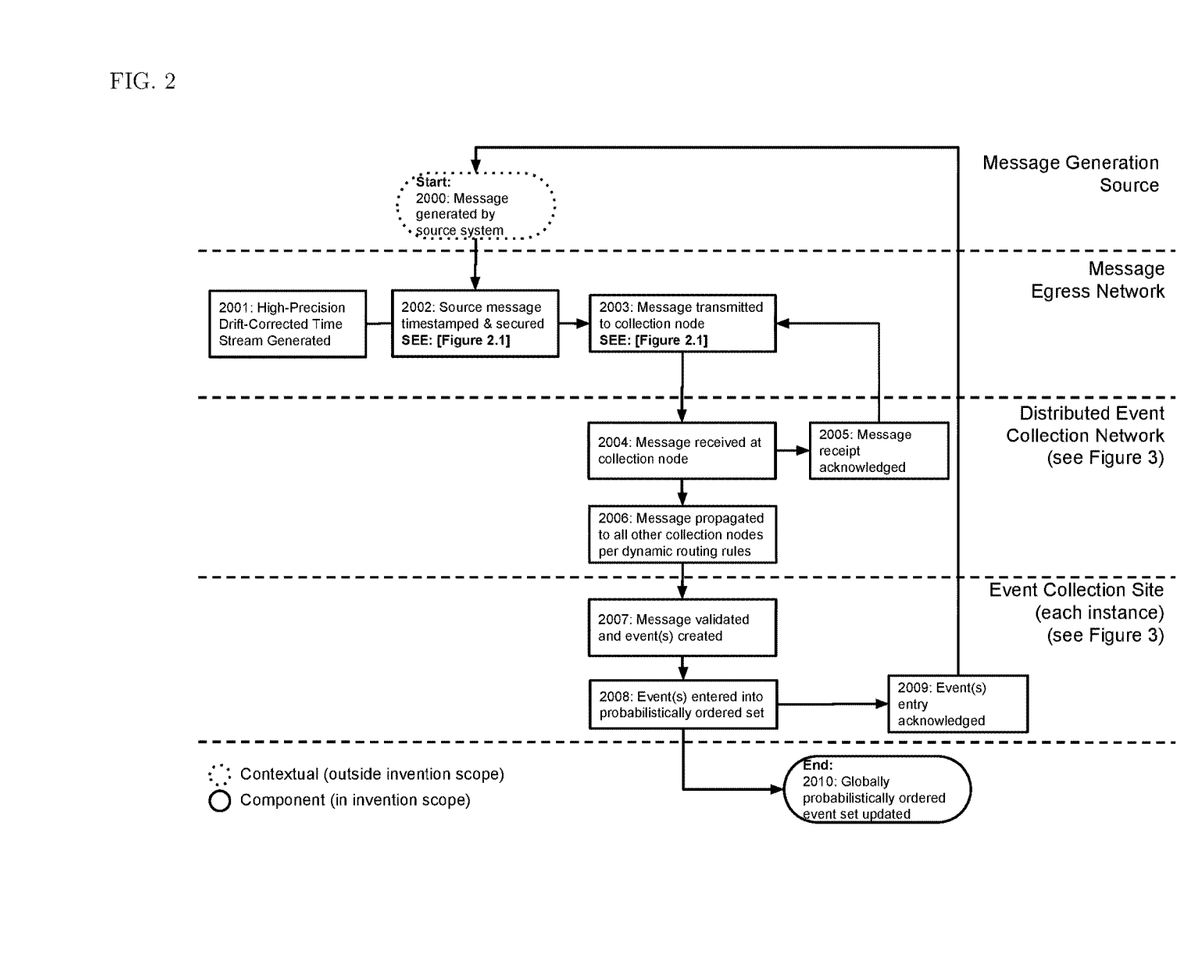
FIG. 2 depicts message generation, propagation, and synchronization.

FIG. 2 depicts the lifecycle of messages and ordering of events across a distributed system at a coarse level of detail. This process includes the creation of source messages [2000], secure message timestamping [2001-2002], message egress [2003], message propagation [2006], event ordering [2008], and acknowledgement [2005, 2009]. For the purpose of this diagram, the term "message" may refer to a single discrete message, or to a pack (bundle) of discrete messages handled as a single unit. Additional detail is provided in other diagrams and in the Detailed Description of the Invention section.

Messages are often generated by source systems that are autonomous and untrusted [2000]. To protect against tampering and error, these messages are times-tamped and cryptographically secured within a single trust zone [2001-2003] under the same authority as their consumer(s) (i.e. collection nodes) [2004].

Figure 5:
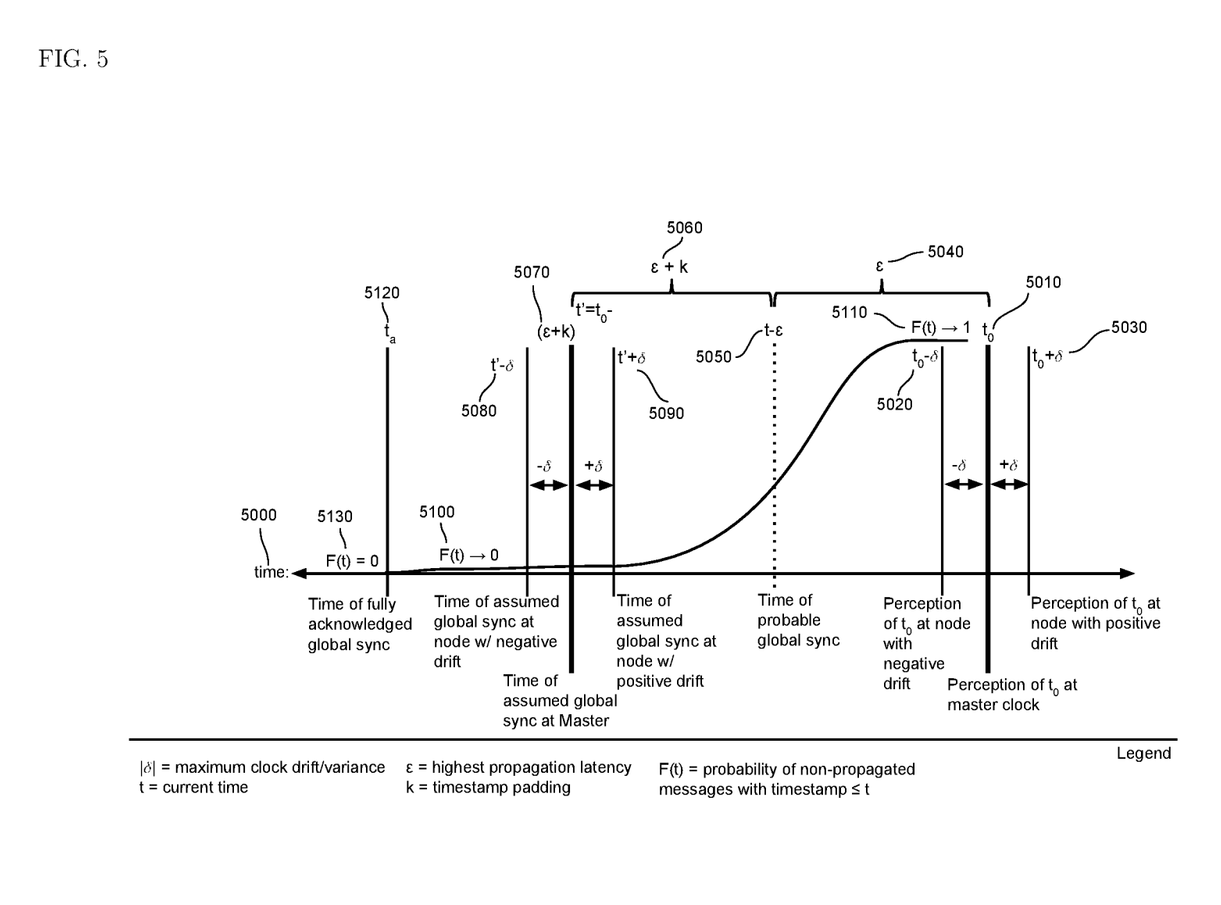
FIG. 5 depicts global event synchronization and timing effects.

After timestamped and secured messages are transmitted to a collection node [2003, 2004], messages are propagated to other collection nodes [2006] such that every node has the same local copy of the global message within a minimal and predictable timeframe. This propagation timeframe represented by E is minimized through a number of mechanisms. FIG. 5 describes this process in greater detail.

Upon receiving a message [2004], each collection node enters the message contents as events into its local view of the probabilistically ordered event stream. Each node maintains a synchronized view of the current time represented as $t_0$. For any current time $t_0$, the timestamp $t_0$-E represents the approximate point in history (viewed from the $t_0$ reference frame) at which each collection node should have received all messages from all other collection nodes [2010]. A node's clock accuracy, synchronization, and resolution is crucial: it directly influences that node's perception of $t_0$-E. FIG. 5 also describes this timeline in greater detail.

Figure 3:
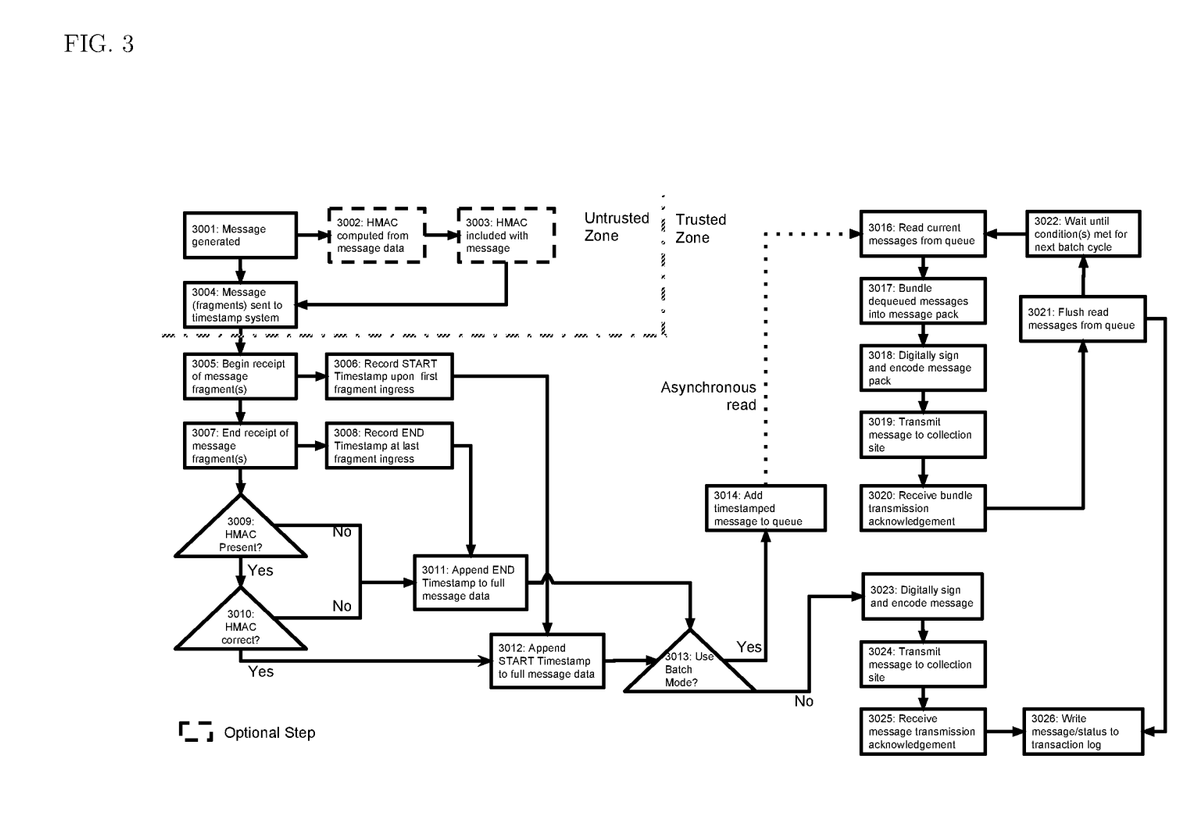
FIG. 3 is the framework for secure message generation and transmission.

FIG. 3 represents the process described in FIG. 2 for timestamping and transmitting messages while minimizing opportunities for tampering and error [3001-3003]. Note that each step in FIG. 2 is a logical step, and may be executed across one or more hosts or physical systems.

The method described herein enables orderly collection of messages from various distributed and untrusted sources. These messages are received by a trusted system (referred to as a "timestamping node") responsible for determining the de-facto message creation time. As described in FIG. 5 and the Detailed Description of the Invention, the global event ordering is sensitive to variance in timestamps. It is therefore crucial that timestamps be applied to messages with high resolution and accuracy. For this reason, message timestamping and security must occur within a trusted zone.

Messages received from untrusted sources may exceed the maximum transfer size for the medium through which they are transmitted, and therefore may be fragmented [3005, 3007]. This presents ambiguity as a range of possible arrival times could be assigned [3006, 3008]. Two scenarios are available for disambiguating message arrival time:

In the case of message fragmentation, the message generator may compute a cryptographically verifiable message signature and hash (e.g. an HMAC) value [3002] on the message data. Transmitting that value in advance of the message [3003] provides proof that the sender held a fully formed message at the time of transmission. If the message receiver detects an HMAC [3009] and the HMAC is correct [3010], the timestamp applied to the full message would match the ingress time of the first fragment containing the HMAC [3012]. In cases where no HMAC is provided by the untrusted message generator [3009] or the HMAC is incorrect [3010], a fragmented message may have been altered mid-transmission between fragments, effectively backdating the message times-tamp. In such cases, the timestamp applied to the message will match the ingress time of the last frame of the complete message [3011].

To support a range of use cases and performance standards, the message egress system may operate in either a batch or a streaming mode [3013]. In batch mode, messages are queued [3014], bundled [3016, 3017], and transmitted to one or more collection node(s) in periodic cycles (or until other sentinel conditions are met) [3019-3022]. Prior to transmission, each message bundle is optionally secured against tampering and error using digital signatures and error-correcting codes (ECCs) [3018]. In streaming mode, each individual message is optionally secured through the same mechanisms (digital signatures and error-correcting codes) [3023] before being transmitted to one or more collection node(s) [3024].

Figure 4:
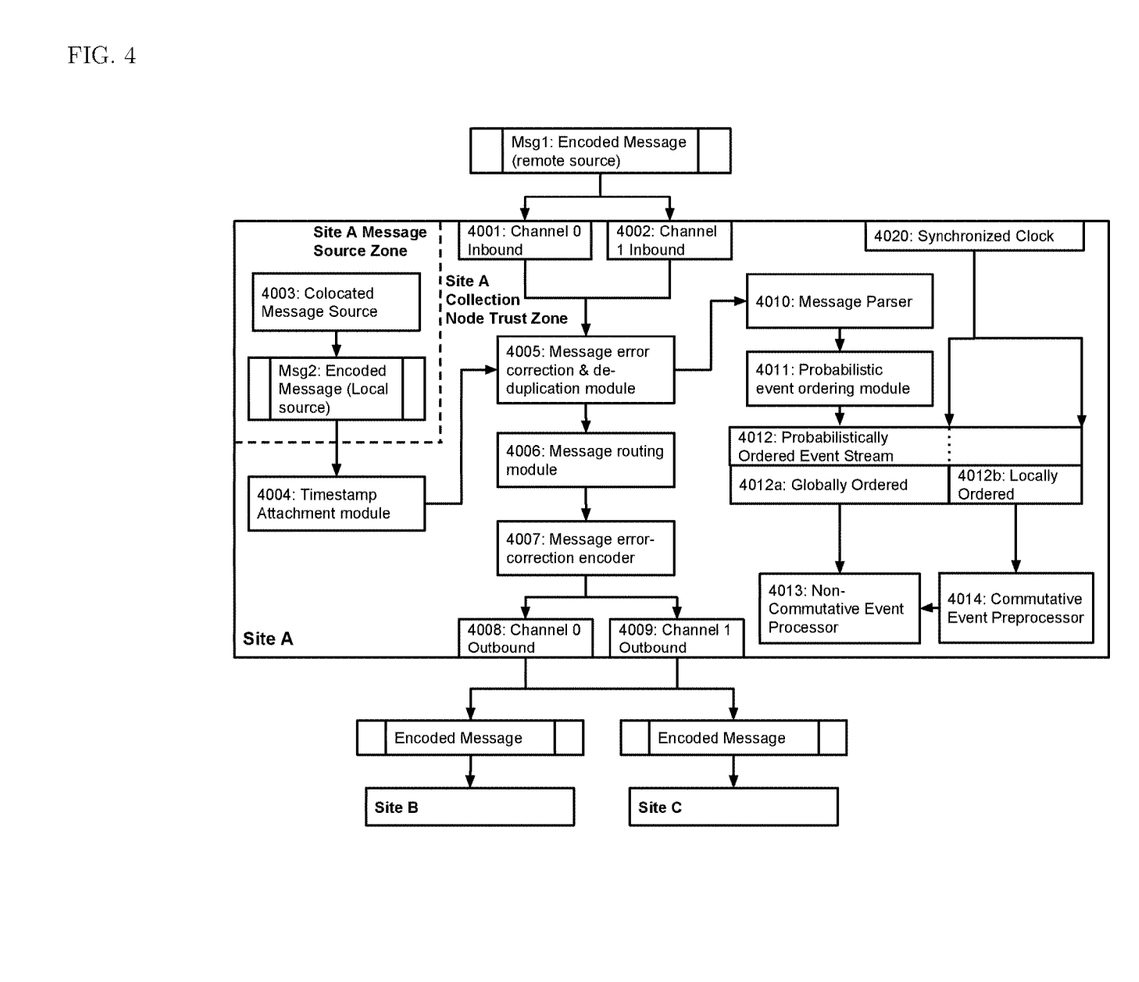
FIG. 4 is the site component architecture.

FIG. 4 intends to represent interaction between logical components at a collection site. The components depicted support the processes described in FIG. 2 steps 2002-2010.

Note that all components listed in FIG. 4 are logical components, and may be implemented on either the same or different hosts or physical systems.

High-precision message timestamping [4004] is crucial for chronologically ordering events in distributed systems. The collection site may ingest messages from both local and remote sources. In the local source model, messages are timestamped upon arrival into the collection node trust zone [Msg2]-[4005]. Remote messages, however, may encounter significant latency in transit to the collection node. As such, timestamps can be applied by a trusted system collocated at the untrusted remote site [Msg1] in order to reduce pre-timestamp latency impact. In both cases, these timestamps are applied by the remote timestamping node using the process described in FIG. 3 and most importantly will determine the ordering of events by the component 4011.

Another core aspect of the distributed system is minimizing the time required to propagate messages across all collection sites. Each site may be responsible for forwarding inbound messages. Note that this diagram depicts Site A transmit-ting messages to sites (and subsequently, nodes) B and C. This arrangement is pro-vided purely as an example; sites may transmit messages to zero or more other sites. Fast propagation minimizes the window during which each site's view of the global event set differs, and reduces the probability that an event is not ordered correctly. Three methods for minimizing propagation time are described: multi-path transfer of ECC-encoded [4001, 4002, 4008, 4009] messages, multi-path transmission with deduplication, and latency-minimizing message routing [4006].

Multi-path encoded transfer: messages encoded with error-correcting codes supporting blocking (such as Reed-Solomon) can be used with high degrees of parity and split across multiple transmission paths or message fragments, minimizing redundant data transfer while providing resilience to link loss and avoiding re-transmission. Parity of error-correcting codes may be set to tolerate the total loss of a transmission link in this scenario.

Multi-path transmission with deduplication: messages are transmitted in entirety across multiple links after attaching a globally unique identifier. Deduplication logic on the side of the receiver ensures that only the first message to arrive is incorporated into the system. This configuration allows for the total loss of one or more message/links while simultaneously reducing variance in transmission time.

Latency-minimizing routing: the time synchronization mechanisms described in the Detailed Description of the Invention can be used to determine distance (measured in latency) between sites. This view of distance can then be used to compute the shortest propagation path that covers all collection nodes.

In parallel with message propagation, each site maintains its own view of the global probabilistically ordered event set [4012, 4012a, 4012b]. New events are placed in the event set using the secure timestamp provided with each inbound message [4011].

Another concept central to the system is that any component of the system $C_n$ can compute the time at which a given message will (with high probability) be visible to any other component $C_m$ of the system, and by extension, the system as a whole. At any given time, there is a known boundary between the globally [4012a] and locally [4012b] ordered event sets, which is determined at each node by the calculations described in FIG. 5. Non-commutative operations should be computed after all messages have arrived, and are therefore performed only on the global probabilistically ordered event set [4012a]. Commutative operations may be processed immediately using the local probabilistically ordered event set [4012b] to maximize speed and performance.

FIG. 5 pertains to the use of timing in the propagation and maintenance of a distributed probabilistically ordered event set with low latency and low probability of inaccurate event ordering.

This diagram depicts a timeline [5000] with an arbitrary "current time" snapshot $t_0$ located at [5010]. In this context, the current time $t_0$ is determined by a master clock within the distributed system which may or may not reflect the exact physical current time. This master clock acts as a reference point for other time-synchronized systems (collection nodes, message sources) in the distributed network, such that the variance $\delta$ between any individual clock and the master clock's current time $t_0$ is minimized [5020, 5030].

At any given time, there may be messages that have not fully propagated to other collection nodes in the distributed system. At arbitrarily selected time $t_0$, there exists a point in time $t_0-E$ [5050] such that any message originating before $t_0-E$ has fully propagated by $t_0$. Stated otherwise, the time $t_0-E$ [5050] corresponds to the timestamp of the most recent event to fully propagate. The value E [5040] is influenced by the amount of time needed to propagate messages across all nodes, and approximates to the latency along the longest propagation path in the distributed network as well as with other factors discussed in the Detailed Description of the Invention.

In practice, signals experience latency variance across most communication links; latency will vary across different propagation paths, and for different messages along the same propagation path. This variance introduces uncertainty in E, and therefore $t_0-E$ for any given $t_0$. To correct for this uncertainty, a padding offset of $\kappa$ units of time is added to E [5060]. The padded time $t^1=t_0-(E+\kappa)$ [5070] is computed by each node, which then assumes that any messages timestamped at or before $t^1$ are fully propagated through all collection nodes. The offset $\kappa$ is selected such that the probability F (t) of non-propagated messages [5100, 5110, 5130] at time $t^1$ is bounded to an acceptable minimum.

Further timing uncertainty is introduced by clock variance, represented as $\delta$. If $t_0-E$ is earlier in time than $t^1+\delta$ for a given node [5080, 5090], there is a high likelihood of events being missing (i.e. not fully propagated) in the globally ordered event set as perceived by that node. Small values of $\delta$ are desirable; not only do they provide for more accurate message timestamps, they decrease the likelihood of events being missing or mis-ordered in the manner described above. However, selected values of $\kappa$ should incorporate the expected $\delta$ such that $\forall\ t^1, t^1+\delta<t_0-(E+\kappa)$ with sufficiently high probability [5060-5100].

Scenarios can be implemented wherein nodes acknowledge receipt of messages propagated by other nodes [5120]. These acknowledgements provide message synchronization assurance at the cost of response times and possible retransmissions. In these scenarios, there exists a time $t_a<t^1$ at which F $(t_a)=0$ [5130].

Figure 6:
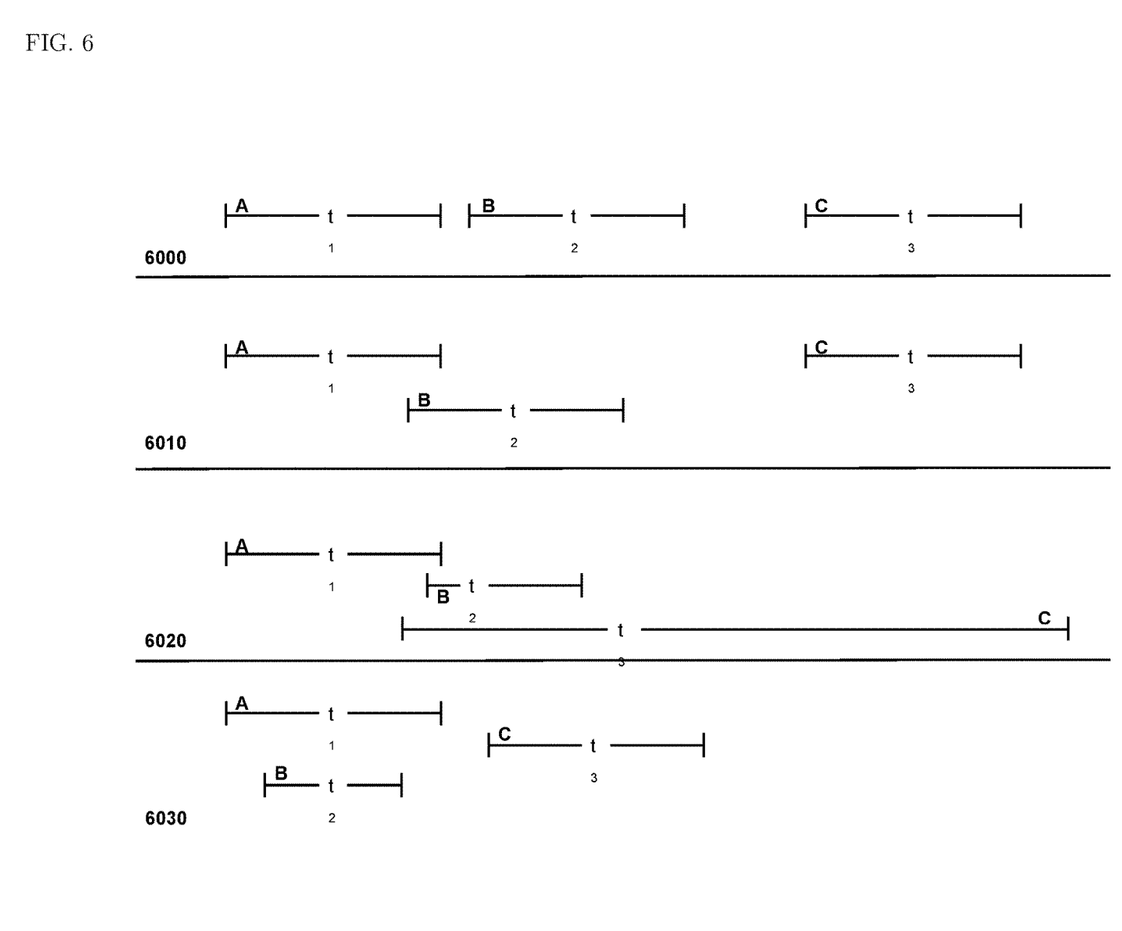
FIG. 6 enumerates event ordering scenarios.

FIG. 6 depicts the potential event orderings that may arise when attempting to linearize a series of events. Three events A, B, C are depicted as occurring at times $t_1, t_2, t_3$ wherein each time has an associated window of uncertainty surrounding it. In [6000] the windows are equal and symmetric with no overlap. In this case, a total, deterministic ordering exists. The scenario depicted in [6010] includes symmetric, equal length windows with partial overlap. As such, there is ambiguity between the ordering [A B C] or [B A C]. No ambiguity exists between the partition [A OR B] [C]. In [6020] overlap occurs between all three events. The symmetry of the windows and the event times suggest that [A B C] is the most likely ordering, but any permutation of the set A, B, C is a valid event timeline with an associated non-zero probability. In [6030] A and B are measured as occurring at exactly the same time, and the uncertainty around the event time of A completely encompasses the uncertainty around the event time of B. Event C is deterministically ordered, as it is in [6010].

DETAILED DESCRIPTION OF THE INVENTION

The disclosed invention relies on physically (and potentially geographically) separate nodes sharing in a precisely synchronized notion of time with known uncertainty bounds. As the levels of accuracy and precision required cannot be achieved by conventional means, specific details of the timing network are described as an enabling technology.

Regardless of their physical mechanism of action, clocks work by counting the number of oscillations (cycles) starting from some reference; doing so relates the passage of time to a known starting point, and the stability of an oscillator ensures that the passage of time is constant and predetermined. To synchronize a system of clocks, both the reference time and the frequency with which oscillator cycles must be known.

Distribution of the reference time can be achieved via a GNSS system such as GPS or Galileo. However, GPS time synchronization (as is common in other time synchronization solutions) is subject to jamming, spoofing, and signal quality issues (GNSS based solutions typically require an outdoor receiver and unobstructed view of the sky). To mitigate these issues, the system uses a plurality of methods and directly incorporates physical error bounds along with estimates of uncertainty into the event distribution algorithm, as discussed in FIG. 5. This makes the system robust against changing conditions and deliberate attacks.

Two way time and frequency transfer (TWTFT) serves as the primary mechanism of synchronization. Depending on the distances involved and physical considerations (line-of-sight, weather) transfer may occur wirelessly (e.g. satellite, microwave, or laser) or via conduit (e.g. copper or fiber optic cables). Unlike GNSS based solutions, these methods allow for the end-to-end encryption and cryptographic signing of time synchronization data while using privately controlled infrastructure. As TWTFT is highly sensitive to asymmetric transmission delays, the following scheme is applied:

Sender signs synchronization data (using a cryptographic signature algorithm), verifies the signature of the output, and sends the signed synchronization data to Receiver.

Receiver verifies Sender's signature before signing the data again with the same key. After verification, TWTFT proceeds as normal.

Forcing both the sender and the receiver to perform a constant amount of work on identical hardware (at the cost of additional latency) ensures that delay is symmetric. Computation should be carried out on a device capable of hard real time operation, such as a cryptographic coprocessor or purpose built FPGA/ASIC.

In situations where synchronization must occur away from the clock (e.g. rooftop access for a terrestrial or satellite link isn't possible), time transfer can be carried out against an intermediary portable clock. After transfer occurs, said clock is placed physically adjacent to and synchronized with the target. This approach can also be applied to synchronize clocks via GNSS. Physical control over the receiver and geographic region in which synchronization occurs greatly reduces the potential for tampering or interference. Using signal averaging or sensor fusion, the aforementioned methods can be used in conjunction to improve both accuracy and precision. Synchronization via secure, private network communications using an algorithm such as NTP or IEEE 1588 serve as a final reference check between sites.

Timekeeping requires both a global reference and an oscillator of known frequency. It is critical that the frequency source remains stable, and that oscillations are frequent enough to generate sufficient resolution. The quality of an oscillator is measured by its Q factor; atomic clocks (e.g. atomic gas, fountain, ion trap) have amongst the highest Q factors and frequencies making them ideal candidates for the system described. However, the term "atomic clock" is used more generally in this document to refer to any high quality oscillator with known, predictable, and stable physical properties.

Using atomic clocks in conjunction with TWTFT, clock ensemble/steering algorithms, and symmetric key encryption results in a secure global timing network with a shared notion of both reference and frequency. Furthermore, TWTFT can be used locally within a data center to calibrate multiple clocks for use in high availability configurations.

Precise and accurate time synchronization (with bounds) [4020] allows the system to reason about the total ordering of events across discrepant nodes and process boundaries. Specifically, when the window of uncertainty surrounding the recorded time of an event does not overlap with the window of any other event, a strict ordering such as 6000 exists. Otherwise, various configurations of two or more events exist, each occurring with some probability. To minimize the width of the window of uncertainty timestamping should occur as close to the edge (message source) as possible. As such, the system relies on a distributed system of geographically discrepant autonomous timestamping nodes, each placed as close as possible to message sources (where distance is measured in terms of latency).

Purpose built networking hardware capable of hard real-time operation is used for timestamping messages like 3004. This is necessary to ensure precision, accuracy, and scalability. Furthermore, timestamping on the network level helps harden the system against failure, as many network routing protocols are built with multipath capabilities and robustness in mind. As network processors route massive volumes of data in a deterministic fashion, this solution is also highly scalable relative to software based timestamping.

The system offers several modes for receiving messages from both trusted and untrusted sources. A trusted source is defined as a message producer that is either internal to the system, or one that has no incentive to manipulate the timestamp associated with a message. Untrusted sources might wish to or benefit from making a message appear as if it arrived either earlier or later than it actually did and as such alter the system's global ordering of events. The Detailed Description of FIG. 2 describes the manner in which messages originating from untrusted sources are handled.

Message sources sensitive to high availability or low latency requirements can optionally employ a multi-path solution based on either message multiplexing or block level error correction [4001, 4002]. The Detailed Description of FIG. 4 describes this multi-path solution. During normal operation, duplication and error correction can reduce the mean network latency and variance as only the min arrival time is considered.

Once the system ingests a message and assigns an event time to it processing can proceed in either batch or streaming mode [3013]. In streaming mode, events are propagated to other sites as they arrive [3024]. Batch mode holds events locally [3017] for additional processing or aggregation until some predetermined or coordinated time, or until other predefined conditions are met [3022].

When in streaming mode, events are propagated from event collection nodes to processing nodes within the network (note that collection nodes and processing nodes may be one and the same as in FIG. 4). Depending on the network topology and configuration in place, either routing or N-to-N message distribution may be used. In either case, the use of path multiplexing or block error correction can reduce mean latency and variance while increasing reliability.

For any network topology the maximum point-to-point path length E (measured in latency) creates a lower bound on the time at which a message can be fully propagated across the network. At [5060], a safety factor κ (the timestamp padding) is added to E. The safety factor is chosen to include the amount of time needed to:

Reconstruct a fragmented message from multiple frames (the amount of time allowed should be bounded, and specified to message senders a priori)

Account for the maximum observed drift on collection node clocks

Perform additional processing on the collection node. The result is an upper bound on the time required to ensure global visibility of a message in typical, error free scenarios as depicted in [5070]. Note that in this configuration, message loss (or equivalently, delay) is possible; use of multipath transmission and error correction mitigates this, but for guaranteed message delivery, the maximum propagation delay must be at least doubled to include time for an acknowledgement message (ACK) [5120].

All components of the system are aware of the maximum expected message propagation time, and any individual component can reason that an event arriving at 5010 will be probabilistically visible to all other components of the system by 5070 and globally acknowledged by 5120. As such, each processing node is free to construct a total ordering on messages older than 5070 or 5120 (the decision being use case dependent). Events are buffered until 5070 or 5120 and sorted by their timestamp continuously as new messages arrive.

Once local time reads 5070 or 5120, event linearization can proceed. FIG. 6 and its detailed description enumerates potential scenarios and configurations that may arise when ordering events. However, the output of any such probabilistic linearization is the set of all possible orderings and their associated likelihood estimates. This configuration can be represented compactly as a tree in which each path from root to leaf encodes a valid ordering of events.

When a series of events cannot be totally ordered the behavior of the system is use case specific. Options for proceeding include: relying on heuristics (which may be as simple as choosing the highest probability ordering or evaluating logical constraints based on current state and the event in question), walking the tree of event orderings to resolve conflicts on an event-by-event basis, accepting only the totally ordered subset of events and handling the potentially conflicted subset separately, communicating with the event creator to resolve conflict, or any combination of the above.

Regardless of the mechanism used to do so, stream processing proceeds once an ordering is established. As events can be any manner of code or data, arbitrary computation is possible. For example, if an event is defined as an operation in the set {CREATE, UPDATE, DELETE} along with an optional data segment, the system has all of the primitives needed to implement a database. When events are treated as machine operations (opcodes), scripts, programs, or data, arbitrary computation is possible.

Employing time-based batching offers highly desirable properties. In batch mode, events are held locally on a collection node until some predetermined batch time $t_b$. Local replication (where local is defined to mean adjacent nodes or geographies) may be employed to ensure durability in the event of a node failure during this time. All collection nodes must be aware of $t_b$, which should be statically configured, independently computable, or negotiated out of band. At $t_b$, each node packages all messages received between the previous batch time $t^1$ and the current batch time into a single logical message (which, on the protocol level, may be distributed as multiple messages). If there is significance to which batch an event falls into, a small delay can be added to $t_b$ before message pack formation to ensure that no messages remain inflight between the timestamping node and the collection node.

Batch messages are broadcast to other nodes using the same framework for message distribution described in the streaming scenario, depicted in 3013 through 3026. However, because processing nodes know $t_b$ and the upper bound on communication with any other node in the system, failure conditions can be detected rapidly and deterministically. Note that if a node has no data to transmit, it must send an empty "heartbeat" message instead. This behavior, unlike the streaming case, allows for guaranteed detection of node failures and message loss.

Packaging multiple smaller messages into larger messages offers efficiency gains as well. For one, larger messages are more efficient to distribute than a set of smaller messages (of the same aggregate size) from a network transmission standpoint. Furthermore, when appropriate, preprocessing and conflation can reduce the total number of messages that need to be propagated system wide.

When messages in a batch represent data and operations that commute over some time window or event subset, additional optimizations are possible and probabilistic linearization is simplified. Specifically, consider the case 6010 in which there is ambiguity in the ordering of {A, B, C} such that both [A B C] and [B A C] are valid. If [[A B] [C]] is logically equivalent to [[B A] [C]], the system need not differentiate between them. As the probability of the system transposing events is a function of clock resolution, synchronization, and the rate/distribution of event arrival, any opportunity to conflate logically equivalent orderings (summing their associated probabilities in the process) will improve the probability that the ordering chosen is logically correct.

The above described technology enables lower latency, higher scalability, and more reliable event distribution than what's possible in any distributed system reliant on coordinated event ordering. While it comes at the cost of increased complexity and a nuanced notion of probabilistic linearizability, the benefits outweigh the costs for many applications. Benefits arise directly from the timing infrastructure (and specifically, the cryptographically secure, multitiered approach to time synchronization). Applications that record and audit input data are made more secure and reliable by the use of highly accurate, globally synchronized timestamps. Furthermore, the system enables the secure and accurate global ordering of events that may be substantially separated in space but not time. Most significantly, at any non trivial distance, the system timestamps and orders events with greater precision and accuracy than what's possible using lightspeed communication.

The disclosed technology provides a practical solution to the separate but related problem of constructing a probabilistically linearizable system in which the amount of time needed to guarantee global consistency is bounded and minimized.

In particular, synchronizing time in a fashion that's robust against both failure and tampering, as well as a method for timestamping messages that arrive in more than one piece (packet/data frame), along with a means of providing resilience against transmission loss without the need for explicit ACK/NAK messages (which necessitate a network round trip and additional latency), lets an exchange decentralize the entry of buy & sell orders, while still maintaining a highly accurate record of when those orders were entered. This allows for a more elegant abstraction that separates order entry from order matching.

The above-described technology is particularly applicable to a decentralized financial exchange, in which the "events" are "orders:" instructions to buy or sell financial instruments, subject to a series of constraints such as minimum or maximum price (among many others). Various order collection sites controlled by the exchange would be physically located in major financial centers around the world, with their local time synchronized with each other collection site (FIG. 1). Order entry would occur as follows:

A trader electronically transmits an order to the nearest order collection site (FIG. 1).

The collection site assigns a secure, high-precision timestamp to the order immediately upon arrival (FIG. 3).

The collection site then propagates the order to the other collection sites (FIG. 1, 3).

Meanwhile, other traders are also submitting orders to their nearest collection sites (FIG. 1), and those orders are similarly propagated.

At this point, there is a list of orders stored at each collection site, sorted by time of entry. At any given time, each collection site will have a different list of orders, since the most recent orders from other sites will not yet have propagated fully. However, there is some time in the relative past (t' in FIG. 5) at which the system has cache coherence. That is, all orders with a timestamp before t' have propagated to every site. Such synchronized timestamping based on order entry rather than order arrival eliminates the incentive for customers to compete on latency to the exchange, which can save billions of dollars in technology infrastructure and engineering expense per year.

Using an estimation of t', a central system for matching orders (the "matching engine") can draw globally consistent sequences of orders from the distributed order entry system as follows:

A central matching engine, which has its time synchronized with the collection sites, periodically extracts all fully propagated orders (those with timestamps earlier than t') from the collection sites.

The matching engine adds the extracted orders to its current "book" containing all open orders.

The extracted orders are removed from the local list of orders at each collection site.

The matching engine uses an auction mechanism to find an optimal matching between buy/sell orders across its updated book.

Matched orders have their quantity constraints updated according to how many units were filled, or are removed if filled completely.

In this manner, the central matching engine can hold auctions at arbitrary times, with confidence that all orders entered into the system are being appropriately considered. Such a matching engine can operate with different levels of fault-tolerance. It can extract orders from one site (fast, least reliable), multiple sites for comparison (slower, more reliable), or all sites for comparison (slowest, most reliable). Moreover, the physical location of the central matching engine does not matter, as long as its local time is synchronized with the collection sites.

Another example of a practical application of the disclosed technology to financial exchanges is the ability to use point-in-time price information from other sources: the exchange can "snapshot" price information from different exchanges and other arbitrary information sources at exactly the same point in time, anywhere on the globe. Computational orders allow traders to "pre commit" decisions based on that snapshot (when it is taken at some future time) so that the exchange can evaluate them in a synchronous fashion.

In one particular example of such pre commit orders, a trader could submit a buy order with conditional logic to purchase stocks at two cents below the current best market price (the Securities Information Processor or "SIP"). In each cycle, the exchange will snapshot the SIP price, and reset the price constraint on the trader's BUY order accordingly, i.e. 2 cents below the SIP snapshot.

In another example: when the exchange is unable to find matches for some amount of open volume, the exchange could determine an optimal price at which orders will match. There may be imbalance when matching at that price, i.e. extra unfilled buy or sell volume. To correct for the imbalance, the exchange could then be programmed to attempt to buy additional volume from other exchanges at a price that meets the constraints of the unfilled orders. The timing of the auctions, liquidity sourcing, and data distribution would be facilitated by the above described time stamping and delayed matching technology.

In yet another example of the additional functionality that could be implemented in such an exchange, (which typically provides its market participants with "execution reports," which inform participants when their orders are filled and provide other summary data) the proposed exchange can be programmed to release those execution reports in a way that doesn't reliably allow any participant earlier access than others. In particular, the disclosed timestamping and delayed execution capabilities can be used to delay the release of such execution reports such that concurrent access to market data is provided to all participants regardless of their respective physical distances from the exchange.

BACKGROUND PUBLICATIONS

M. P. Herlihy and J. M. Wing, "Linearizability: a correctness condition for concurrent objects", *ACM Transactions on Programming Languages and Systems* (*TOPLAS*), vol. 12, no. 3, pp. 463-492, 1990.

V. Gramoli, "Distributed shared memory for large-scale dynamic systems", PhD thesis, Université Rennes 1, 2007.

L. Lamport, "Time, clocks, and the ordering of events in a distributed system", *Communications of the ACM*, vol. 21, no. 7, pp. 558-565, 1978.

J. C. Corbett, J. Dean, M. Epstein, A. Fikes, C. Frost, J. J. Furman, S. Ghemawat, A. Gubarev, C. Heiser, P. Hochschild, et al., "Spanner: google's globally distributed database", *ACM Transactions on Computer Systems (TOCS)*, vol. 31, no. 3, p. 8, 2013.

W. HSIEH, A. Lloyd, and E. VEACH, *Systems and methods of increasing database access concurrency using granular timestamps*, WO Patent App. PCT/US2013/044,163, December 2013. [

P. Hochschild, A. Lloyd, W. Hsieh, R. Felderman, and M. Epstein, *Generating globally coherent timestamps*, U.S. Pat. No. 8,938,636, January 2015.

What is claimed:

1. A trusted data communication system under the control of an independent system operator for the synchronized collection and distribution of digital data among a plurality of spatially distributed user infrastructures each under the control of a respective third party user, comprising trusted event infrastructure for directly connecting each instance of user infrastructure with the trusted communication system, wherein:

each instance of the trusted event infrastructure consists of a Stratum Zero high-precision timekeeping device in conjunction with a hardware apparatus capable of decoding messages or signals from the Stratum Zero high-precision timekeeping device and attaching a network level timestamp to data flowing through the trusted event infrastructure at the point of ingress;

each instance of the trusted event infrastructure is an integral part of the trusted data communication system and is under the exclusive control of the independent system operator;

each instance of the trusted event infrastructure is within a predetermined permissible distance of the respective user infrastructure and other instances of the trusted event infrastructure, whereby the trusted event infrastructure is able to determine when event data is transmitted from that user infrastructure or received by that user infrastructure, or between instances of the trusted event infrastructure within a predetermined permissible uncertainty ascertained from a process model of network propagation times; and the trusted event infrastructure receives and timestamps event data messages from the user infrastructure and distributes the timestamped messages for further processing.

2. The trusted data communication system of claim 1, wherein at least some of the event data messages are coded by the user infrastructure with a unique message signature prior to receipt by the trusted event infrastructure, whereby a single coded message may be transmitted in multiple transmission segments to the trusted event infrastructure and subsequently processed within the trusted data communication system as having a common transmission time corresponding to the timestamp of the first received segment of that message even though at least some segments of that same message had not actually been received by the trusted event infrastructure at the time indicated by that timestamp.

3. The trusted data communication system of claim 1, wherein some of the timestamped event data messages are assembled into batches and transmitted in batch mode.

4. The trusted data communication system of claim 1, further comprising a framework for replicating and probabilistic ordering of events across a distributed system that allows for statements of the form 'with probability p, Event A preceded Event B' or 'with probability p, a given instance of the trusted event infrastructure has received all events received by other instances of the trusted event infrastructure prior to time T,' using a process model of network propagation times and timestamps attached to events by the trusted event infrastructure.

5. The trusted data communication system of claim 1, wherein variance in network transmission times is reduced through the use of message multiplexing and error correction functionality whereby event data is replicated either fully or partially across one or more network paths between trusted data communication system instances, or between a trusted data communication system instance and a client instances.

6. The trusted data communication system of claim 1, utilizing specialized computing hardware capable of real-time processing to detect and avoid delays in the timestamping, distribution and processing of data flowing into and through the trusted event infrastructure.

7. The trusted data communication system of claim 1, further utilizing specialized hardware for one-way or two-way time and frequency transfer to precisely estimate total message propagation delay across a distributed system.

8. A distributed global data communication system for forming a probabilistically ordered view of events, comprising:

trusted event infrastructure for directly connecting each instance of user infrastructure with the trusted communication system, wherein:

each instance of the trusted event infrastructure consists of a Stratum Zero high-precision timekeeping device in conjunction with a hardware apparatus capable of decoding messages or signals from the Stratum Zero high-precision timekeeping device and attaching a network level timestamp to data flowing through the trusted event infrastructure at the point of ingress;

each instance of the trusted event infrastructure is an integral part of the trusted data communication system and is under the exclusive control of the independent system operator;

each instance of the trusted event infrastructure is within a predetermined permissible distance of the respective user infrastructure and other instances of the trusted event infrastructure, whereby the trusted event infrastructure is able to determine when event data is transmitted from that user infrastructure or received by that user infrastructure, or between instances of the trusted event infrastructure within a predetermined permissible uncertainty ascertained from a process model of network propagation times; and at least some of the timestamped event data messages are assembled into batches and transmitted in batch mode;

a framework for replicating and probabilistic ordering of events across a distributed system that allows for statements of the form 'with probability p, Event A preceded Event B' or 'with probability p, a given instance of the trusted event infrastructure has received all events received by other instances of the trusted event infrastructure prior to time T,' using a process model of network propagation times and timestamps attached to events by the trusted event infrastructure;

message multiplexing and error correction functionality for reducing latency variance in expected network transmission times whereby event data is replicated either fully or partially across one or more network paths between trusted data communication system instances, or between a trusted data communication system instance and a client instances; and specialized computing hardware capable of hard real-time processing to detect and avoid asymmetric delays in time transfer the timestamping, distribution and processing of data flowing into and through the trusted event infrastructure.

9. The distributed global data communication system of claim 8, wherein the events include instructions to buy or sell financial instruments on a distributed financial trading venue or exchange comprised of:

a plurality of trusted event infrastructure instances serving as order entry and data collection sites, wherein:

data from users are transmitted to or received by the most latency proximate instance of the trusted event infrastructure;

instances of the trusted event infrastructure applies a timestamp to data upon ingress using the hardware timestamping capabilities of the trusted event infrastructure;

the exchange utilizes one or more matching mechanisms sensitive to the sequence in or time by which user orders are received;

the exchange utilizes the timestamps provided by the trusted event infrastructure to form a probabilistic ordering of events to use in the auction or match process.

10. The distributed global data communication system of claim 9, wherein at least some of the orders include conditional logic that is based on data observable by the exchange at an agreed upon time present or future; the hardware timestamping and synchronization capabilities of the trusted event infrastructure are used to capture the data needed to evaluate conditional logic attached to the order at the agreed upon time.

11. The distributed global data communication system of claim 9, wherein execution reports or trades consummated by the exchange are released to all users in a coordinated fashion using the hardware timestamping and synchronization capabilities of the trusted event infrastructure.

* * * * *